Patented Mar. 28, 1950

2,502,390

UNITED STATES PATENT OFFICE 2,502,390

WAX-SUBSTITUTED POLYALKYL-THIOPHENE

Orland M. Reiff, Woodbury, and Harry J. Andress, Jr., Pitman, N. J., assignors to Socony-Vacuum Oil Company, Incorporated, a corporation of New York No Drawing. Application March 2, 1945, Serial No. 580,706

5 Claims. (Cl. 260—329)

This invention relates generally to the synthesis of the homologues of alkyl thiophenes, and is more particularly concerned with a process for alkylating alkyl thiophenes in the presence of catalytic material comprising metal halides.

Alkylation reactions are well known and connote the union between alkyl radicals and molecules of organic compounds under conditions of temperature, pressure, and time ordinarily referred to in the art as alkylating conditions. The compounds thus produced are called alkymers and represent, structurally, the addition of the original alkyl radical to the organic compound molecule. The product of an alkylation reaction is broadly referred to in the art as an alkylate and usually contains the alkymer, residual amounts of reactants, and products of secondary reactions that occur concurrently with the alkylation reaction.

Generally speaking, the temperature and to a certain extent, the pressure and time of reaction employed in alkylation operations depend upon whether the alkylation is effected in the absence (when at all possible) or presence of alkylation catalysts. The two methods are generally referred to as thermal and catalytic alkylation, respectively.

In alkylation reactions, the alkyl radical may be furnished by a variety of substances accordingly known in the art as alkylating agents. Olefinic hydrocarbons, alkyl halides, alcohols, and aralkyl halides have been among the most widely proposed alkylating agents.

As is well known to those familiar with the art, the synthesis of the homologues of thiophene has been effected mostly through the Wurtz reaction, i. e., by condensing the iodo-derivatives of thiophene with iodo- or bromo-alkyls in the presence of metallic sodium. The Friedel-Crafts synthesis has also been proposed for preparing thiophene homologues, i. e., the condensation of thiophene and alkyl halides in the presence of aluminum chloride. This reaction although applicable with considerable success in the alkylation of aromatic hydrocarbons is not generally successful where thiophene is involved. Aluminum chloride causes polymerization of the thiophene into a resin which is unreactive and insoluble in the alkylating agent.

In this connection, it is believed that the chemical behavior of thiophene is very similar to that of benzene. However, there are some very striking differences. This is illustrated by the fact that we have found for instance, that the alkylation catalysts ordinarily used in the alkylation of benzene are not suitable in the alkylation of thiophene. Moreover, catalysts which readily effect the alkylation of thiophene will not always effect the alkylation of benzene.

We have now discovered that higher homologues of alkyl thiophenes may be obtained in an efficient manner by reacting alkyl thiophenes with alkyl halides in the presence of metal halide alkylation catalysts.

We have found that metal halide alkylation catalysts effect the alkylation of alkyl thiophenes with alkyl halides smoothly and efficiently, in contrast to the attempted alkylation of thiophene with alkylating agents in the presence of metal halide alkylation catalysts. In accordance with our process, alkyl thiophenes are not unduly polymerized, the products being almost entirely higher homologues of the alkyl thiophene reactants having in addition to the original alkyl side-chains, one or more side chains corresponding to that of the alkyl halide reactant.

Accordingly, it is an object of the present invention to provide an efficient process for synthesizing the homologues of alkyl thiophenes. Another object is to provide a process for alkylating alkyl thiophenes. A very important object is to afford a process for catalytically alkylating alkyl thiophenes. A more specific object is to afford a process capable of carrying out the above objects by reacting alkyl thiophenes with alkyl halides in the presence of metal halide alkylation catalysts. Other objects and advantages of the present invention will become apparent to those skilled in the art from the following description.

Broadly stated, the present invention provides a process for alkylating alkyl thiophenes, which comprises contacting an alkyl thiophene with an alkyl halide in the presence of a metal halide alkylation catalyst.

Any metal halide alkylation catalyst may be used. Aluminum chloride, aluminum bromide, zinc chloride, and ferric chloride may be mentioned by way of non-limiting examples of metal halide alkylation catalysts suitable for the process of our invention. We have found it economically advantageous to use aluminum chloride because of its high activity and low price. The amounts of alkylation catalyst to be used in our process ordinarily vary between about 1% and about 10% based on the weight of the alkyl thiophene in the charge.

In accordance with our invention, any alkylatable alkyl thiophene, i. e., an alkyl thiophene containing at least one hydrogen atom on the thiophene ring capable of replacement by an alkyl group, can be reacted with alkyl halides to form more highly alkylated thiophenes. We have found that even in the presence of an alkylation catalyst as active as aluminum chloride, which, as stated hereinbefore, polymerizes thiophene readily, it is possible to alkylate alkyl thiophenes efficiently and smoothly. Dialkyl thiophenes, for example, dibutyl thiophene, or trialkyl thiophenes, for example, dipropyl-amyl thiophene, may just as readily be further alkylated in the presence of metal halide alkylation catalysts as the monoalkyl thiophenes such as methyl thiophene.

The alkylating agents to be used in our process are the alkyl halides ordinarily used in alkylation operations, such as ethyl iodide, amyl fluoride, cetyl chloride, chlorinated paraffin waxes, and lauryl bromide. We especially prefer to use the chlorides and bromides. The use of alkyl halides as alkylating agents is particularly advantageous when it is desired to alkylate the alkyl thiophenes with alkyl groups containing ten carbon atoms and upward. Olefinic hydrocarbons are the alkylating agents most commonly used in alkylation operations. A conventional source of olefinic hydrocarbons is the fixed gases obtained as by-products of commercial cracking operations around petroleum refineries, and the unsaturates produced in alkylation processes. However, the olefinic hydrocarbons obtained from this source are low molecular weight hydrocarbons. Therefore, when it is desired to alkylate the alkyl thiophenes with alkyl groups containing a relatively large number of carbon atoms, using the corresponding olefinic hydrocarbons as alkylating agents, it becomes necessary to obtain these from other sources as is well understood in the art. One well known method is to subject high molecular weight alkyl halides obtained by halogenating paraffinic hydrocarbons to a dehydrohalogenation operation. Accordingly, one of the advantages of the process of our invention is that through the initial use of alkyl halides as alkylating agents, the additional dehydrohalogenation operation is eliminated.

In the preparation of the alkyl halides, a paraffinic hydrocarbon containing the number of carbon atoms ultimately desired in the alkyl substituent in alkyl thiophene to be alkylated, is subjected to halogenation in any manner known to the art. It is possible to introduce one to three atoms of halogen in each molecule of paraffinic hydrocarbon. When the paraffinic hydrocarbon contains from ten to fifteen carbon atoms, it is preferable to use the theoretical amounts of halogen required to give one atom of halogen per molecule of hydrocarbon. When the paraffinic hydrocarbon contains fifteen carbon atoms and upward, it is preferred to use the theoretical amounts of halogen required to give one to two atoms of halogen per molecule of hydrocarbon. Small amounts of polyhalides are always formed, even where the amounts of halogen employed are such that should produce theoretically, monohalides. This results in residual amounts of unreacted paraffinic hydrocarbons. The unreacted paraffinic hydrocarbons can be removed from the reaction mixture by distillation or dewaxing methods, depending on the boiling point of the paraffinic hydrocarbon, and reused in the halogenation operation.

The amounts of alkylating agents to be employed may vary within wide limits. Ordinarily, we prefer to use an amount of alkyl halide containing one atomic weight of halogen for each replaceable hydrogen on the thiophene ring. When greater amounts are employed, the excess amounts of alkyl halides may become dehydrohalogenated under the conditions of the reaction with resultant formation of unsaturated hydrocarbons which remain as such or as polymers thereof in the reaction mixture.

There appears to be nothing particularly critical in the reaction conditions of our process. The reaction rate is largely a function of the temperature, increasing with increasing temperatures, the upper limit of the temperature being that at which dealkylation is favored. Generally speaking, temperatures varying between about 200° F. and about 350° F., and atmospheric pressure have been found satisfactory for effecting the alkylation reaction. The effect of increased pressure, theoretically, is toward increased reaction, but from a practical standpoint, this is not a very great effect with reactions such as those involved herein which go readily at normal pressures. We have found that the temperature to be employed depends upon the time of reaction, the activity of the catalyst, and the nature of the alkylating agent used. Ordinarily, we employ a temperature at which the reactants will be in the liquid phase; and we use lower temperatures when the more reactive alkyl halides like amyl chloride are employed and higher temperatures when the less reactive alkyl halides like chlorinated paraffin waxes are used. The reaction time depends upon the temperature, the reactivity of the alkyl halide, and the activity of the catalyst. Accordingly, it may vary between some minutes and several hours, and can be adjusted to continuous and batch operation.

It must be understood, that these reaction variables are more or less interdependent. Hence, when one is arbitrarily fixed, the limits within which the others may be varied are somewhat restricted. In any particular instance, the most desirable conditions can be readily ascertained by one skilled in the art, the preferred ranges of these variables having been indicated hereinbefore.

The process may be carried out as a batch, continuous or semi-continuous type of operation. For efficient operation, whether the process is carried out on a batch or continuous basis, it is essential that the reactants be intimately contacted with the catalyst. This may be achieved in several ways as is well known in the art.

Alkyl thiophenes are useful as special solvents and in the preparation of sulfonates for use, for example, as wetting agents. We have found that alkyl thiophenes containing alkyl groups having fifteen or more carbon atoms in the longest carbon chain are viscous oils which are valuable as synthetic oils or as blending agents or additives for mineral oils. Generally speaking, any alkyl thiophene containing at least one alkyl substituent having more than fifteen carbon atoms in the longest carbon chain, and preferably about twenty-four carbon atoms in the longest carbon chain, is suitable for this purpose. The polyalkylated thiophenes are the most valuable in this respect. Accordingly, the alkylation of alkyl thiophenes with alkyl halides having fifteen or more carbon atoms in the longest carbon chain must be considered a preferred embodiment of our invention. Such alkyl thiophenes possess viscosity index values varying between about 60, when the alkyl substituent has fifteen carbon atoms in the chain, and about 135, when the alkyl substituent is a paraffin wax having a carbon chain length of about 24 carbon atoms, and have fair stability against oxidation and attendant formation of acid and sludge. The alkyl thiophenes containing one or more alkyl substituents having less than fifteen carbon atoms in the longest carbon chain do not possess these valuable properties. It must be understood that when we speak of a paraffin wax, we have reference to paraffinic hydrocarbons containing at least eighteen carbon atoms in the longest carbon chain, and having melting points varying between about 90° F. and about 140° F. We have found that particularly outstanding results are obtained with paraffin waxes containing on the average of twenty-four carbon atoms in the longest carbon chain and having melting points of about 126° F. Good results are also obtained with cerese waxes derived from petroleum. These waxes have melting points as high as 180° F. Accordingly, halogenated cerese waxes are also contemplated for use as alkylating agents in the process of the present invention. Mineral oil blends containing such alkyl thiophenes have improved oxidation stability when compared to the mineral oils without such additives. The alkyl thiophenes are miscible with mineral oils in all proportions.

The following detailed examples are for the purpose of illustrating modes of effecting the alkylation of alkyl thiophenes in accordance with our invention, it being clearly understood that the invention is not to be considered as limited to the specific alkyl halides and metal halide alkylation catalyst disclosed hereinafter or to the manipulations and conditions set forth in the examples. As it will be apparent to those skilled in the art, a wide variety of other alkyl thiophenes may be prepared by suitable modifications of the alkyl thiophene reactant and of the alkyl halide reactant.

EXAMPLE 1

*Paraffin wax-substituted dibutyl thiophene*

A mixture consisting of 100 grams of dibutyl thiophene, 260 grams of chlorinated paraffin wax having a 14% by weight chlorine content (the paraffin wax has a molecular weight of about 350 and a melting point of about 126° F.), and 3% by weight of anhydrous aluminum chloride, was heated to a temperature of about 350° F. in about one hour while stirring vigorously to avoid foaming induced by the evolution of hydrogen chloride. The mixture was kept at this temperature for another hour while still stirring, to insure complete reaction. Stirring was stopped when hydrogen chloride no longer was evolved. To purify the product, the mixture was cooled to a temperature of 150–200° F., and an amount of water equal to about one quarter the volume of the reaction mixture was added. 3% by weight of zinc dust was then added and the mixture was stirred for about ½ hour. During the stirring, the product was decolorized and the aluminum chloride was dissolved in the water layer which separated and was removed. After several washings with water, using butanol to break any emulsions formed, the mixture was heated to remove the butanol and any residual water. The residuum was the wax-substituted dibutyl thiophene. The properties of the product are listed in the table set forth hereinafter.

EXAMPLE 2

*C₁₅-substituted dibutyl thiophene*

The run described in Example 1 was repeated, but in this case, the 260 grams of chlorinated paraffin wax were replaced with 260 grams of chlorinated ink oil having a 14% by weight chlorine content. (Ink oil contains paraffinic hydrocarbons having about fifteen carbon atoms in the longest carbon chain.) The product was purified in a manner similar to that set forth in Example 1. The properties of the product obtained are listed in the table set forth hereinafter.

EXAMPLE 3

The run described in Example 1 was repeated but in this case, 130 grams of the chlorinated paraffin wax were used. This proportion of reactants represents one molecular weight of dibutyl thiophene per each atomic weight of chlorine in the chlorowax. The properties of the product obtained are listed in the following table.

*Properties of alkyl thiophenes*

| Product of Example | 1 | 2 | 3 |
|---|---|---|---|
| A. P. I. Gravity | 24.6 | 26.9 | 25.3 |
| Kinematic Viscosity in Centistokes: | | | |
| at 100° F | 184.9 | 16.89 | 65.02 |
| at 210° F | 19.00 | 3.33 | 8.90 |
| Viscosity Index | 116.9 | 60.0 | 117.5 |
| Neutralization Number | 0.6 | 0.6 | 1.0 |
| Sulfur Content—Per cent by weight | 4.9 | 3.72 | 6.9 |
| Molecular Weight | 557 | | 504 |
| Pour Point (A. S. T. M.), ° F | +80 | −30 | +80 |

The pour points of the products obtained in the runs set forth in Examples 1 and 3 are noted to be high. For use as synthetic oils where low pour points are required, the products can be dewaxed by ordinary methods used in dewaxing mineral oil lubricants. Products having pour points of +20° F. may be obtained by dewaxing the products obtained in the runs described in Examples 1 and 3 by diluting them with 600% by weight of methyl ethyl ketone, cooling to a temperature of 0° F. and filtering at this temperature, followed by distillation of the methyl ethyl ketone.

*Action as blending agents for mineral oils— Lauson engine test*

[Motor oil having a Saybolt viscosity at 210° F. of 45 seconds (kinematic viscosity of 5.8 centistokes).]

| Inhibitor | 5% of product obtained in Example 3 | 5% of product obtained in Example 2 | None |
|---|---|---|---|
| Neutralization Number | 1.2 | 7.1 | 14.3 |
| Kinematic Viscosity in Centistokes at 210° F | 6.11 | 7.97 | 9.23 |
| Hours run | 36 | 36 | 36 |

Although the present invention has been described in conjunction with preferred embodiments, it is to be understood that modifications and variations may be resorted to without departing from the spirit and scope of the invention, as those skilled in the art will readily understand. Such variations and modifications are considered to be within the purview and scope of the appended claims.

We claim:

1. A wax-substituted dibutyl thiophene having a composition corresponding to the formula $C_4SH_{4-(m+2)}(C_4H_9)_2R'_m$ and a sulfur content of at least about 4.9 per cent, a molecular weight of at least about 500, a viscosity of at least about 65 centistokes at 100° F. and a viscosity index of about 117, R' being a hydrocarbon wax substituent having about 24 carbon atoms.

2. Polyalkylthiophene having at least three alkyl groups of which at least one is an alkyl group having 15 to 24 carbon atoms and at least one alkyl group has three to five carbon atoms.

3. A wax-substituted polyalkylthiophene having a composition corresponding to the formula $C_4SH_{4-(n+m)}R_nR'_m$, in which R' is a hydrocarbon wax substituent having at least 18 carbon atoms, R is an alkyl group having not more than five carbon atoms, $n$ is one to three and $m$ is one to three.

4. A wax-substituted polyalkylthiophene having a composition corresponding to the formula $C_4SH_{4-(n+m)}R_nR'_m$, in which R' is a hydrocarbon wax substituent containing 18 to 24 carbon atoms, R is an alkyl group having three to five carbon atoms, $n$ is two to three and $m$ is one to two.

5. A polyalkylthiophene having at least three alkyl groups and a composition corresponding to the formula $C_4SH_{4-(n+m)}R_nR'_m$, in which R' is a hydrocarbon wax substituent containing 18 to 24 carbon atoms, R is an alkyl group having three to five carbon atoms, $n$ is one to three and $m$ is one to three.

ORLAND M. REIFF.
HARRY J. ANDRESS, Jr.

REFERENCES CITED

The following references are of record in the file of this patent:

UNITED STATES PATENTS

| Number | Name | Date |
|---|---|---|
| 2,140,545 | Pier | Dec. 20, 1938 |
| 2,141,593 | Clark | Dec. 27, 1938 |
| 2,141,611 | Malishev | Dec. 27, 1938 |
| 2,174,246 | Lieber | Sept. 26, 1939 |
| 2,250,118 | Brezesinska | July 22, 1941 |
| 2,297,292 | Davis | Sept. 29, 1942 |
| 2,396,144 | Anderson | Mar. 5, 1946 |
| 2,429,575 | Appleby | Oct. 21, 1947 |

OTHER REFERENCES

Thomas: "Anhydrous Aluminum Chloride," page 198, Reinhold Publ. Co., N. Y., 1941.

Caesar and Sachanen, Ind. Eng. Chem., 40, 922 (1948).

Richter: "Organic Chemistry," pages 649–50, Wiley, N. Y., 1938.

Calloway, N. O.: "The Friedel-Crafts Synthesis," Chemical Reviews, 17, 336, 339, 341, 371, 375, 381 (1935).

Karrer: Organic Chemistry, Nordeman, publisher, 1938, page 701.